May 23, 1944.  M. E. MARTELLOTTI  2,349,595
MACHINE TOOL CONTROL MECHANISM
Filed Dec. 9, 1940   4 Sheets-Sheet 1

INVENTOR.
MARIO E. MARTELLOTTI
BY
HH Parsons
ATTORNEY.

May 23, 1944.    M. E. MARTELLOTTI    2,349,595
MACHINE TOOL CONTROL MECHANISM
Filed Dec. 9, 1940    4 Sheets-Sheet 4

INVENTOR.
MARIO E. MARTELLOTTI
BY
A H Parsons
ATTORNEY.

Patented May 23, 1944

2,349,595

UNITED STATES PATENT OFFICE 2,349,595

MACHINE TOOL CONTROL MECHANISM

Mario E. Martellotti, Cincinnati, Ohio, assignor to The Cincinnati Milling Machine Co., Cincinnati, Ohio, a corporation of Ohio Application December 9, 1940, Serial No. 369,204

18 Claims. (Cl. 90—18)

This invention relates to machine tools and more particularly to improvements in control mechanisms for governing the transmissions thereof.

The main object of this invention is to consolidate the control of the various adjusting elements of a milling machine transmission under a single lever which is selectively operable to change the feed rate or the speed rate; which is effective to stop relative movement between the tool and work when either of these changes is attempted during operation of the machine; and which is also effective to disengage the main spindle clutch and cause operation of a power jogging mechanism which will slowly rotate the spindle transmission during speed changes therein.

Another object of this invention is to provide a control mechanism for effecting speed and feed changes in a milling machine without a multiplicity of adjustments.

A further object of this invention is to provide an interlock between the speed change control mechanism and the main control clutch whereby the clutch will be disengaged when the speed change mechanism is operated and will be delayed in reengaging until all of the shiftable elements of the transmission have completed their shifting movement.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts.

A conventional milling machine is usually equipped with a spindle which is rotatable at variable rates for driving a circular cutter, and some form of work support which is relatively movable with respect to the cutter for feeding a work piece along a path tangentially thereto.

Due to the large number of variants entering into the question of economical machining of a given work piece, it is necessary to provide separate transmissions for the spindle and work support so that either may be varied relative to the other to yield a variety of combinations from which to select the proper machining rate. Power operable means have been provided in the past for shifting the gears of the respective transmissions to change the output rate thereof. These changes must often be made in the midst of a machining operation, in which case a multiplicity of adjustments are now necessary in order to make the change.

For instance, the feeding movement must be stopped so that the work is not fed into a dead cutter, the spindle transmission should be disconnected from its actuating prime mover to prevent gear clashing, and it is also desirable that a jogging mechanism be utilized to effect a slow rotation of the spindle transmission to facilitate intermeshing of the gears being shifted. By means of this invention the control elements for all of these functions, as well as the control of clutches which govern actuation of the feed and speed change mechanisms have been consolidated and operatively connected to a single control lever.

This lever is selectively shiftable in opposite directions from a neutral position. Movement in one direction to the speed change position will produce a predetermined sequence of events such as disengagement of the spindle clutch, power rotation of the selector valve, disconnection of hydraulic pressure from the selector valve during rotation thereof, actuation of a jogging mechanism, and disconnection of the work support from its transmission to stop the feeding movement. Return movement of the lever to neutral will reconnect pressure to the selector valve, effecting the desired gear shifts, reengage the spindle clutch after all gear shifts have been completed, stop the jogging mechanism and reconnect the work support to its transmission. When the lever is shifted to the feed change position, it effects disconnection of the work support from its transmission, and power operation of the feed change mechanism. When the lever is returned, these operations are reversed.

Figure 1:
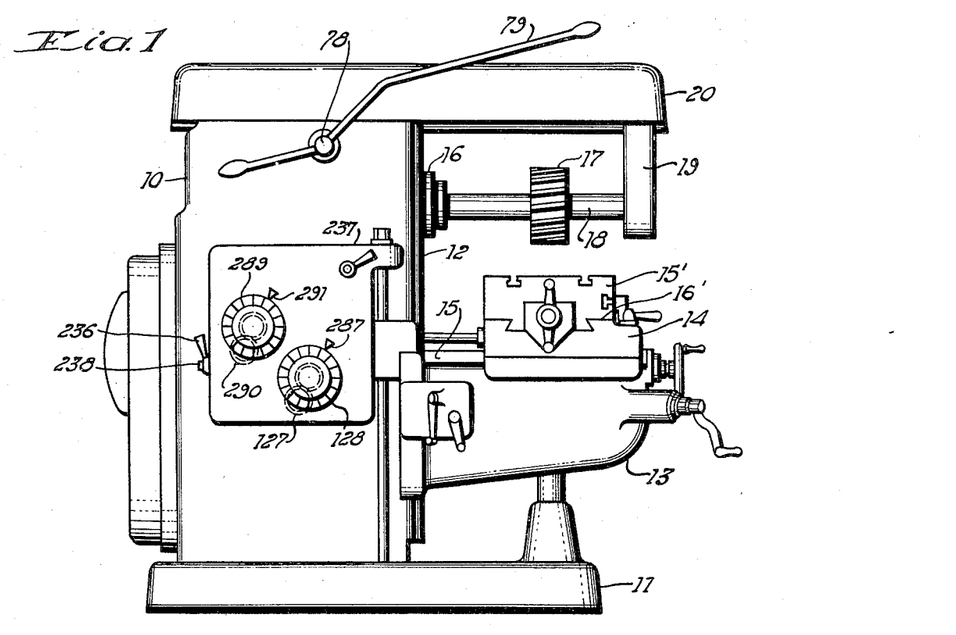
Figure 1 is a side view of a milling machine embodying the principles of this invention.

In Figure 1 of the drawings there is shown a conventional milling machine having a column 10 uprising from a pedestal 11, the column having vertical guideways 12 for supporting a vertically movable knee 13. The knee supports a saddle 14 for cross movement on guideways 15, and the saddle, in turn, carries a work support or table 15' which is movable parallel to the face of the column on guideways 16'. A cutter spindle 16 is journaled in the column for rotating a cutter, such as 17 which may be supported by arbor 18. When the arbor is utilized, a pendant 19 is provided for rotatably supporting the outboard end of the arbor and the pendant, in turn, is supported from the column through an overarm 20.

Figures 3, 5:
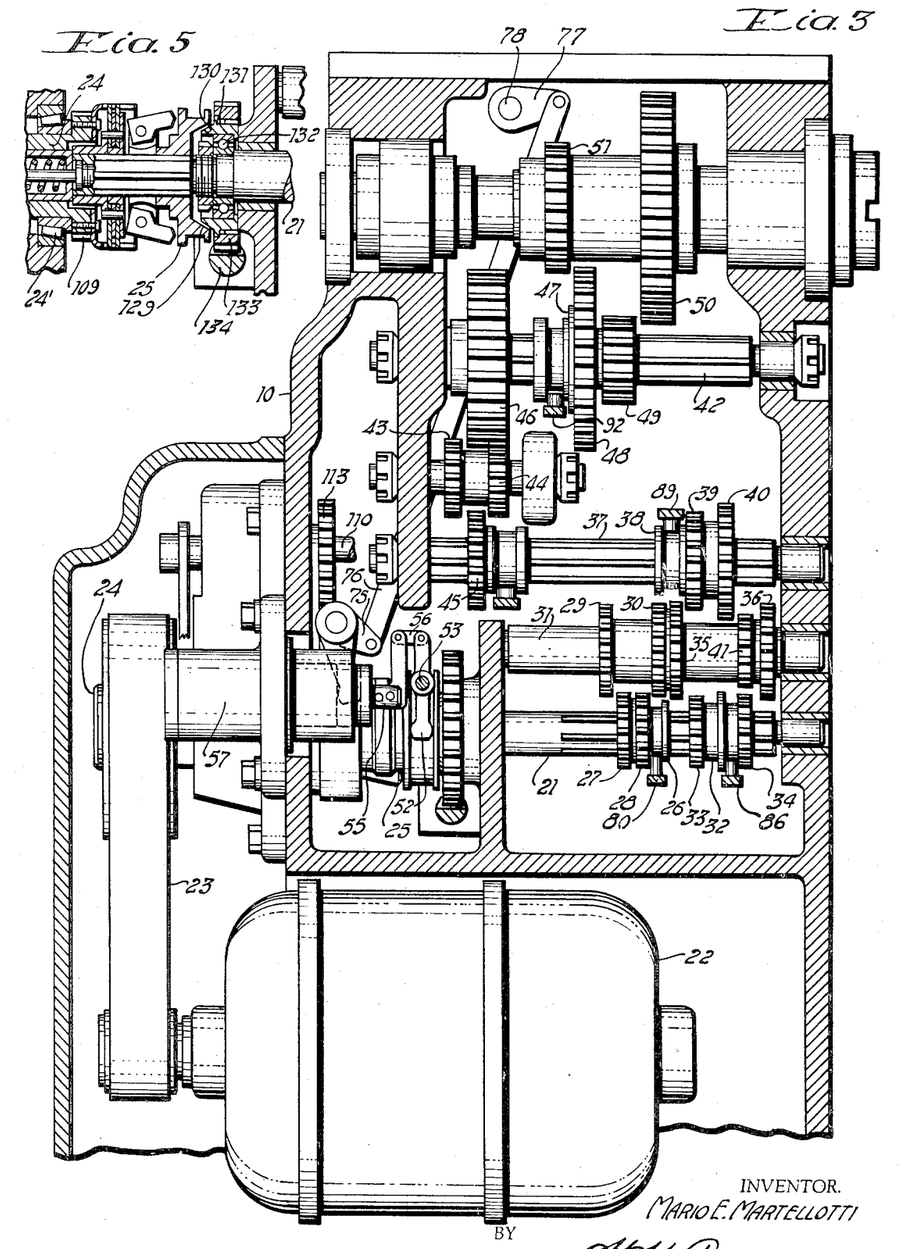
Figure 3 is a sectional view through the column of the milling machine showing an expanded view of the spindle transmission.
Figure 5 is a detail sectional view of the spindle clutch mechanism.

The transmission for driving the cutter spindle 16 is more particularly shown in Figure 3 and comprises a primary shaft 21 which is adapted to be driven by the prime mover 22 which in this instance is an electric motor. The motor is connected by the belt 23 for continuous rotation of a sleeve 24 supported by bearing 24' in the column 10, Figure 5. A shiftable clutch member 25 connects the sleeve for rotation of the shaft 21.

The shaft 21 has a shiftable gear couplet 26 splined thereon comprising gears 27 and 28 which are alternately shiftable into engagement with gears 29 and 30 fixed on a secondary shaft 31. A second gear couplet 32 is also splined on the shaft 21 comprising gears 33 and 34 which are alternately shiftable into engagement with gears 35 and 36 respectively fixed on the shaft 31.

A third shaft 37 has a spline gear couplet 38 thereon comprising gears 39 and 40 which are alternately shiftable into engagement with gears 35 and 41.

By means of these three sets of shiftable gear couplets it will be apparent that the shaft 37 may be driven at any one of eight different speeds.

A fourth shaft 42 is included in the spindle transmission and is reversibly connectible with the shaft 37 by means of a reversing mechanism comprising a pair of idler gears 43 and 44, a shiftable gear 45 splined on the shaft 37 and a gear 46 fixed with the shaft 42.

The gear 45 normally meshes with the gear 46 to effect one direction of rotation of the spindle 16 but when shifted to the left as view in Figure 3 it disengages gear 46 and interengages the idler gear 43.

Since the idler gear 44 is in constant mesh with the gear 46 it will be apparent that this shifting will reverse the direction of rotation of the shaft 42.

A gear couplet 47 is splined on the shaft 42 and consists of a large gear 48 and a pinion gear 49. When the couplet 47 is shifted to the right, the pinion gear 49 meshes with large gear 50 fixed with the spindle 16 whereby a series of low speed rates may be imparted to the spindle. When the couplet 47 is shifted to the left, the gear 48 intermeshes with a smaller gear 51 fixed with the spindle whereby a series of high speeds may be imparted to the spindle.

Actuation of the spindle transmission is controlled by the clutch 25 which has a shifter fork 52 supported on a shaft 53 and the shifter fork is oscillated by a piston 54 which, as shown in Figure 3, is connected by the piston rod 55 and link 56 to the upper end of the shifter fork 52. The piston 54 is slidably mounted in a cylinder 57 and the admission of pressure to one end of this cylinder is controlled by a servo-valve. It will be noted from Figure 4 that one end of the cylinder 57 is connected by a channel 58 directly to the output of a pump 59. This pump has an intake 60 through which fluid is withdrawn from a reservoir 61. The channel 58 has a branch 62 which is connected to a relief valve 63 whereby a predetermined pressure is maintained in the channel 58.

Figure 4:
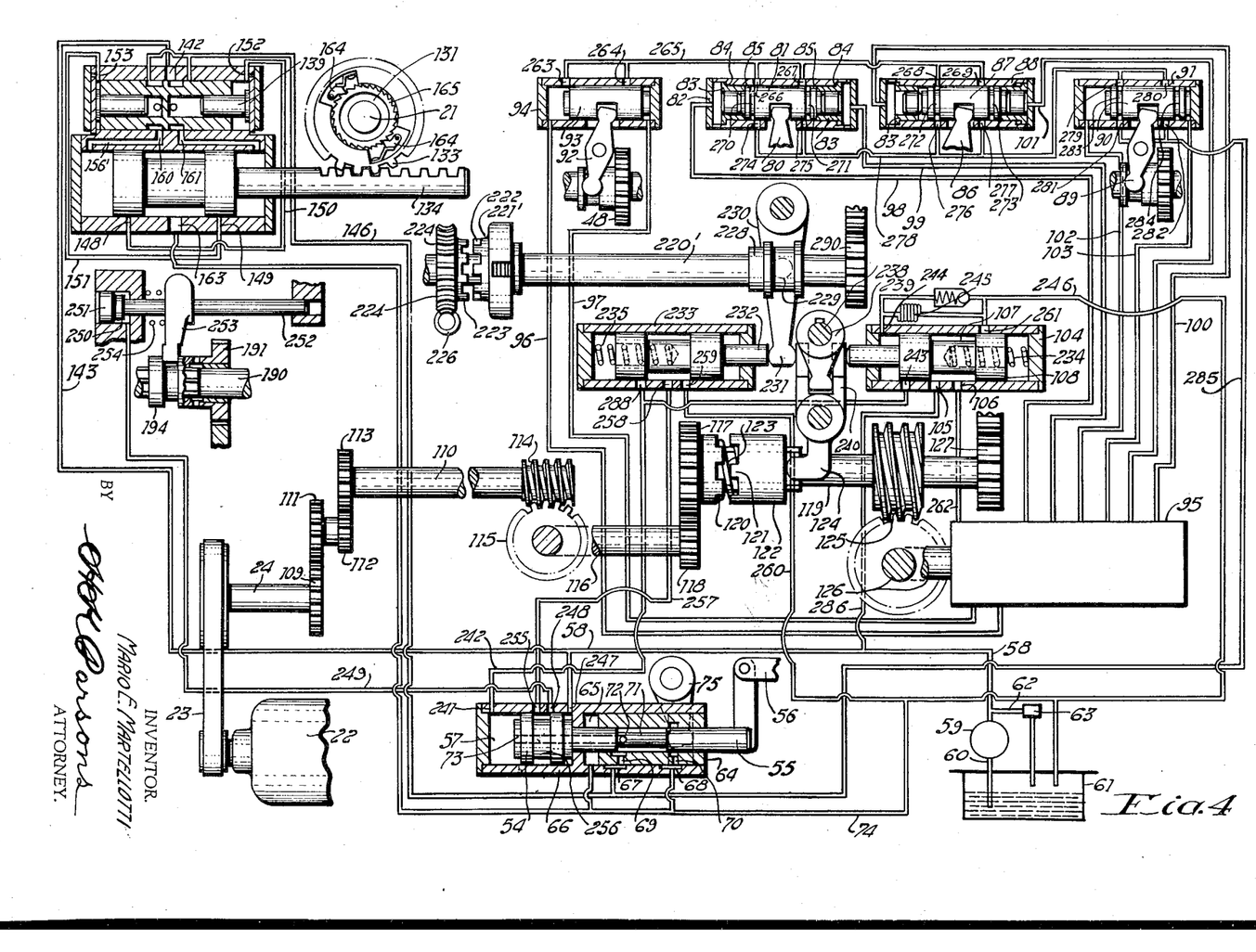
Figure 4 is a diagrammatic view of the control mechanism of this invention.

The servo-valve includes a sleeve 64 which is slidably mounted relative to the piston rod in a bore 65 formed in the housing 66. This housing has a pair of spaced ports 67 and 68 which are in continuous communication with radial ports 69 and 70 formed in the sleeve. The piston rod 55 has an annular groove 71 in which a diametrical hole 72 intersects an axial bore 73 formed in the rod and communicating with one end of the cylinder 57. The port 68 is continuously connected to the reservoir 61 by means of the return channel 74. It should now be obvious if the port 67 is under pressure with the parts in the position shown that this pressure will flow through the port 69 in sleeve 64 and the interdrilling in the piston rod 55 to the left end of cylinder 57. This pressure will be substantially equal to pump pressure and since the area of the left end of piston 54 is larger than the area of the right end of the piston due to the piston rod the total pressure on the left end of the piston will be the greater, resulting in the piston being moved to the right hand end of the cylinder. This movement effects engagement of the spindle clutch 25.

The valve sleeve 64 is operatively connected by a bell crank 75 to a link 76, Figure 3, which is pivotally connected to a crank arm 77. The crank arm is fixed on a shaft 78 which extends to the exterior of the machine where it is provided with a manual control lever 79, Figure 1. When the control lever 79 is pushed upward to the position shown in Figure 1 it effects counterclockwise rotation of the crank 77 and thereby counterclockwise rotation of the bell crank 75. This shifts the sleeve 64 to the right, closing the port 70 and opening the port 69, whereby pump pressure is admitted to the left end of cylinder 57 forcing the piston 54 to the right.

When the sleeve is shifted to the left, the exhaust port 70 will be opened and the pressure port 69 closed, whereby the constant fluid pressure in the right hand end of cylinder 57 can now shift the piston 54 to the left, forcing the fluid in the left end of the cylinder to reservoir through the channel 74. This will effect disengagement of the clutch 25. Thus, the operation of the clutch 25 may be manually controlled through the servo-valve mechanism.

A power operable speed change mechanism is provided for shifting the gears of the spindle transmission and it comprises, in general, a plurality of fluid operable gear shifters, a selector valve which has 16 stations per revolution, power operable means for rotating the selector valve, and a dial on the exterior of the machine for indicating the current position of the valve. The gear couplet 26 is operatively connected by a pivoted shifter 80 to a fluid operable piston 81 slidably mounted in a cylinder 82. The couplet 26 has three positions, one of which is a neutral position which it assumes when the gear couplet 32 is in mesh. Likewise, the couplet 32 has a neutral position when the couplet 26 is in mesh. It is, therefore, necessary to provide means for centralizing the piston 81. This is accomplished by mounting flanged neutralizing sleeves 83 on the reduced ends of the piston and admitting pressure to both ends of the cylinder whereby the flanged sleeves engage shoulders 84 on the interior of the cylinder and shoulders 85 on the piston rod, thereby forcing the piston to a central position.

When pressure is admitted to only one end of the cylinder and the other end is connected to exhaust, the piston 81 will be moved either to the right or to the left to engage either gear 27 or gear 28 with its mating gear.

The couplet 32 is operatively connected by a pivot shifter 86 to a piston 87 which is slidably mounted in a cylinder 88. This piston is also capable of being moved into three positions and the same means are provided for accomplishing this as was provided for the piston 81.

The couplet 38 is connected by a pivoted shifter 89 to a fluid operable piston 90 which is slidably mounted in a cylinder 91. This piston only has two positions. The gear couplet 47 is connected by a pivoted shifter 92 to a piston 93 slidably mounted in a cylinder 94. This piston also has only two positions. The ends of all of these cylinders are connected by separate channels to a selector valve indicated by the reference numeral 95. For instance, the opposite ends of cylinder 94 are connected by channels 96 and 97 to individual ports in the selector valve. The opposite ends of cylinder 82 are likewise connected by channels 98 and 99 to the selector valve while the cylinder 88 is connected by channels 100 and 101 to the selector valve.

When one of these channels is connected to pressure and the other connected to exhaust both of channels 98 and 99 are connected to pressure whereby the couplet 26 is neutralized while the couplet 32 is in a motion transmitting position. Conversely when channel 98 or 99 is connected to pressure while the other is connected to exhaust, both of channels 100 and 101 are connected to pressure whereby the couplet 32 is neutralized while the couplet 26 is in a working position.

The cylinder 91 is connected by channels 102 and 103 to the selector valve. The selector valve is supplied with pressure from the pump 59 through an interlock control valve 104 which has a pair of ports 105 and 106 which are normally interconnected by an annular groove 107 in the plunger 108 of this valve. Thus, during the operation of the machine, fluid pressure is connected to all of the cylinders in one manner or another in accordance with the position of the selector valve to hold the gears in the proper position to produce the desired speed.

The internal construction of the selector valve is not shown herein because such valves are known in the art and the selector valve indicated herein may be of the same construction as that shown in U. S. Patent No. 2,012,081, issued August 20, 1935, and therefore specific description thereof is not believed to be necessary.

The selector valve is power driven through a branch train actuated by the prime mover 22. This train is diagrammatically shown in Figure 4 and comprises a gear 109 which is mounted on the continuously driven sleeve 24, whereby the gear is driven independently of the position of the spindle clutch 25. This gear is operatively connected to a shaft 110 through intermediate idler gears 111 and 112 and gear 113 fixed on the shaft 110. A worm 114 and a worm gear 115 interconnect the shaft 110 to shaft 116. The latter drives a clutch gear 117 by means of gear 118. The clutch gear is supported for free rotation on a shaft 119 and has clutch teeth 120 which are engageable by clutch teeth 121 on the shiftable clutch member 122.

The clutch member 122 is splined on the shaft 119 and normally held in a disengaged position by a spring 123. A pivoted shifter 124 serves to effect engagement of the clutch to drive shaft 119 which is operatively connected through gearing 125 to the selector valve shaft 126. Since the clutch gear 117 is continuously rotated by the prime mover it will be apparent that the selector valve may be actuated at any time whether the spindle transmission is running or not.

The shaft 119 is operatively connected through gearing 127 for rotating the dial 128 located on the outside of the machine as shown in Figure 1.

To facilitate intermeshing of the shiftable gears with the fixed gears a power jogging means has been provided for imposing a slow rotation on the spindle transmission during the time of gear shifting. Referring to Figure 5, the clutch member 25 which is operatively connected at all times to the shaft 21, is provided with an internal conical surface 129 which engages a conical surface 130 on the brake member 131.

When the spindle clutch is disengaged by the servomotor it is moved into engagement with the brake, thus producing a quick stop of the spindle. The braking element 131 is, however, supported for rotation on the bearing 132. It is provided with a ring gear 133 which intermeshes with a rack 134. The rack 134 is in effect a piston rod which is operatively connected to a valve piston 135 which forms part of a power oscillator indicated generally by the reference numeral 136 in Figure 8.

Figure 8:
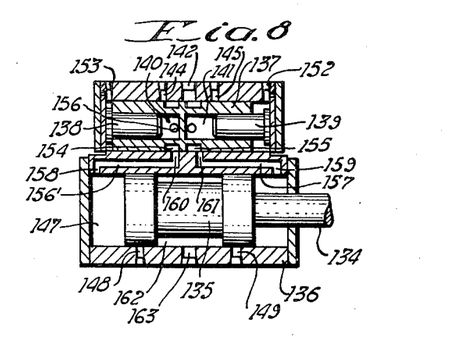
Figure 8 is a sectional view of the power jogger.

The oscillator has a reversing valve in the form of a sleeve 137, Figure 8. Fixed plugs 138 and 139 enter opposite ends of the sleeve to form chambers 140 and 141. The oscillator has a pressure port 142 which is connected by channel 143 to the pump delivery channel 58. Exhaust ports 144 and 145 are located on opposite sides of the pressure port and connected to channel 146.

The cylinder 147, in which the valve piston 135 reciprocates, is provided with a pair of spaced ports 148 and 149 which are connected by channels 150 and 151 respectively to ports 152 and 153 located in the extreme ends of the reversing valve housing as shown in Figure 4. The sleeve 137 is provided with two annular grooves 154 and 155 which are connected by radially drilled holes 156 to chambers 140 and 141 respectively. The interdrilled passages 156' and 157 terminate in ports 158 and 159 which are located at opposite ends of cylinder 147.

The other ends of these passages terminate in ports 160 and 161 which are properly positioned to be in continuous communication with the annular grooves 154 and 155 respectively.

In operation, the pressure fluid enters port 142 and with the valve sleeve to the left, as shown, it flows into chamber 141, and through the passage 157 to the right hand end of cylinder 147. This causes the valve piston 135 to move toward the left and rotate the gearing. Since the port 158 is connected to the exhaust port 144, the piston 135 will move toward the left uncovering port 148 and port 149 in that order. The annular groove 162 will interconnect port 148 to an exhaust port 163 whereby the port 152 located in the right hand end of the sleeve valve housing will also be connected to reservoir, thus relieving any pressure on right end of the valve sleeve 137. When the port 149 is subsequently uncovered the fluid pressure will flow through channel 151 to port 153 applying pressure to the left end of the valve sleeve 137. The projected area of the end of the valve sleeve is greater than the end area of the plug 139 and therefore even although pump pressure exists in the chamber 141 the total pressure on the end of the sleeve will be greater causing the sleeve to move toward the right.

As the sleeve moves toward the right it will restrict the opening of the exhaust port 144 creating a certain amount of back pressure in the chamber 140 which will act to assist the shifting movement and then when the pressure port 142 is opened to admit pressure to chamber 140, the pressure will be further increased in chamber 140. This will tend to equalize or offset the pressure in chamber 141, leaving a resultant pressure on the end of the sleeve 137 which will complete the movement of the sleeve. Fluid pressure will now enter the left end of cylinder 147 through passage 156' causing movement of the valve piston 135 to the right. The ring gear 133 carries ratchet pawls 164 which engage a ratchet wheel 165 integral with the brake member 131 and positioned to be effective upon clockwise rotation of the gear 133.

This produces rotation of the shaft 21 in a direction opposite the direction it will be driven by the motor 22. This is necessary in order that when the braking load is placed on the brake member, it will move in a direction to transmit the load through the ratchet pawls to the piston which will be moved to one end of its cylinder to absorb the load.

Figure 2:
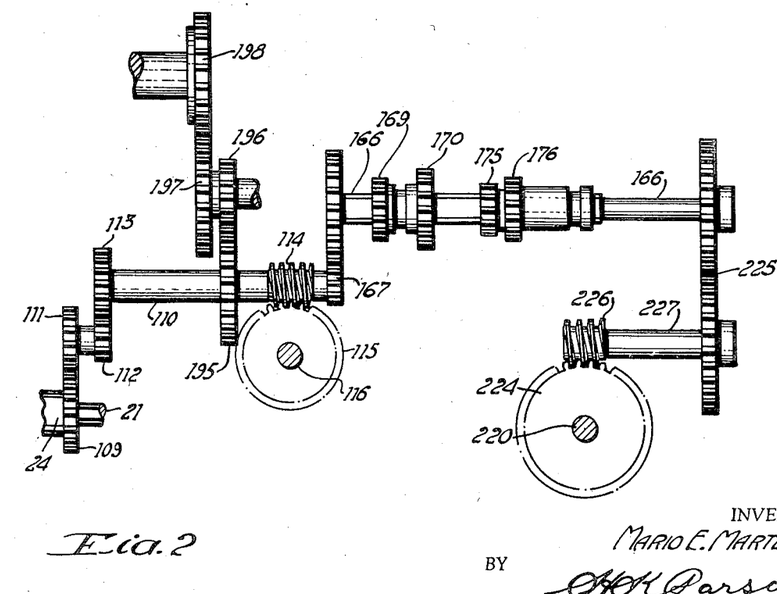
Figure 2 is a diagram of the branch gear trains for driving the feed and speed change mechanism.
Figure 6:
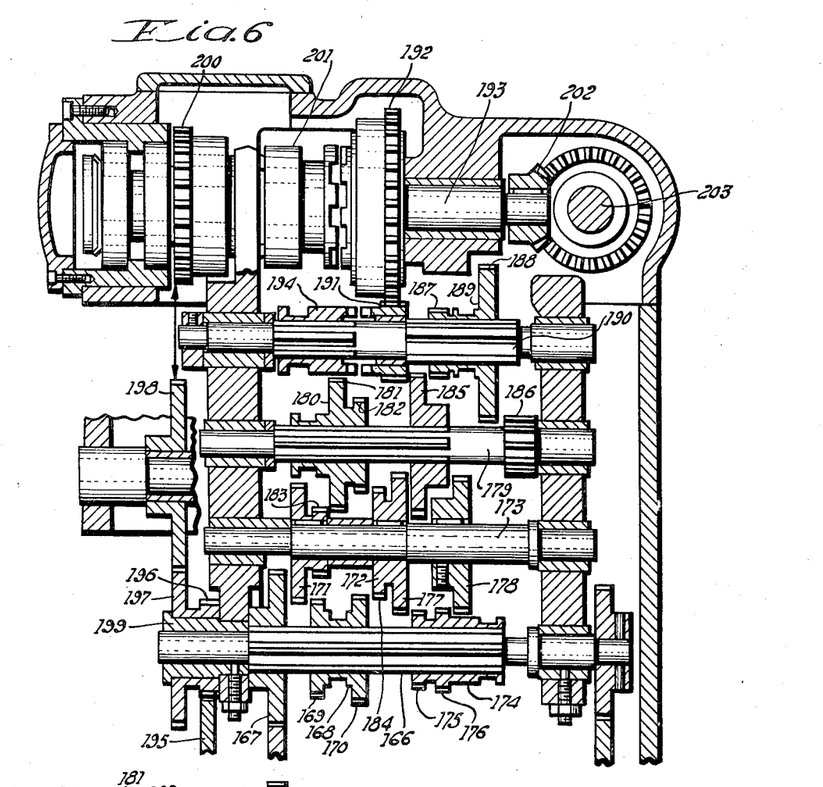
Figure 6 is an expanded view of the feed transmission.

The variable feed transmission is shown in Figure 6 and has a primary drive shaft 166. This shaft is driven from the constantly rotating shaft 110 through gearing 167 as shown in Figure 2. The shaft 166 has a first couplet 168 splined thereon and comprising gears 169 and 170 which are alternately shiftable into mesh with gears 171 and 172 mounted on shaft 173.

A second couplet 174 is slidably splined on the shaft 166 and comprises gears 175 and 176 which are alternately shiftable into mesh with gears 177 and 178. The couplets 168 and 174 each have three positions, one of which is a neutral position whereby when one couplet is in a driving position the other is in a neutral position.

A third shaft 179 in the transmission has a couplet 180 splined thereon and comprising gears 181 and 182 which are alternately shiftable into mesh with gears 183 and 184 respectively fixed on the shaft 173. By means of the three shiftable couplets 168, 174 and 180, the shaft 179 may be driven at any one of eight different speeds. The shaft 179 also carries fixed gears 185 and 186 which are alternately engageable by gears 187 and 188 of couplet 189 slidably splined on shaft 190. The shaft 190 has a gear 191 supported for free rotation thereon and in constant mesh with gear 192 supported for free rotation on the final output shaft 193. A shiftable clutch member 194 is slidably splined on the shaft 190 for connecting the gear 191 to the shaft 190. This clutch member serves to disconnect the feed transmission from the final output shaft 193 whenever rate changes are made in the machine.

The final output shaft 193 may also be driven at a fast or rapid traverse rate through a rapid traverse gear train which is arranged in parallel with the feed transmission. This train begins with the gear 195 shown in Figure 2 and fixed to the constantly rotating shaft 110. The gear 195 is connected through idler gears 196 and 197 to gear 198. The idler gears 196 and 197 are supported for free rotation on a sleeve 199 which also serves to journal one end of the shaft 166 as more particularly shown in Figure 6.

The gear 198 intermeshes with a gear 200 which is also supported for free rotation on the shaft 193. A feed rapid traverse selector clutch 201 serves to alternately connect the final feed gear 192 or the final rapid traverse gear 200 to the shaft 193 for alternate actuation of the work support at variable feed rates or at a rapid traverse rate. The shaft 193 is connected by bevel gearing 202 to a vertical drive shaft 203 which is operatively connected through any suitable known gear train for actuation of the work support 15'.

Figure 7:
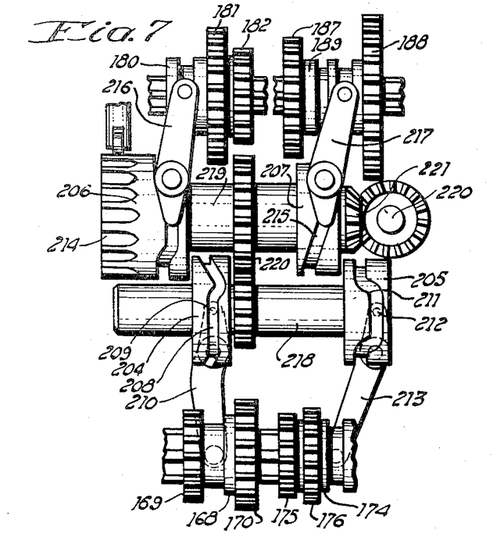
Figure 7 is a view of the feed rate change mechanism.

The power operable mechanism for shifting the various gears of the feed transmission to vary the output rate thereof is shown in Figure 7 and comprises four cams 204, 205, 206 and 207. The cam 204 has a cam groove 208 for receiving the follower 209 of a pivoted shifter 210 for the gear couplet 168. The cam 205 has a cam groove 211 for receiving the follower 212 of a pivoted shifter 213 for the couplet 174. Likewise, the cams 206 and 207 have cam grooves 214 and 215 respectively for controlling the movements of shifters 216 and 217 which are operatively connected to the gear couplets 180 and 189. The cams 204 and 205 are fixed on shaft 218 and this shaft is driven from the shaft 219 through gearing 220 which has a 1-2 ratio whereby the shaft 218 makes two revolutions for one revolution of shaft 219. The shaft 219, and thereby all the cams, are driven by the shaft 220' which is operatively connected to the shaft 219 through bevel gearing 221. Referring to Figure 4, the shaft 220' has a clutch member 221' fixed thereto upon which are formed clutch teeth 222 for engagement with clutch teeth 223 formed integral with the worm gear 224.

The worm gear 224 is actually held against axial movement and the shaft 220' is moved relative thereto to effect engagement of the clutch teeth. The worm wheel 224 is driven from the shaft 166 as shown in Figure 2 through spur gearing 225 and worm 226, the latter being supported on shaft 227 to which is attached one member of the spur gearing.

The shaft 220' has a shifter spool 228 fixed thereon and operatively connected by a roller 229 to a pivoted shift lever 230. This lever has a ball-shaped end 231 which fits between the end of a plunger 232 of an interlock valve 233 and the end of shift lever 124. A spring 234 in valve 104 acting on the end of plunger 108 and a spring 235 mounted on the valve 233 and acting on the end of plunger 232 serve to maintain contact between the ends of the levers and the ends of the plungers at all times.

A master feed-speed change control lever 236 is mounted on the exterior of the gear box 237 as shown in Figure 1 and this lever is keyed to the end of a shaft 238. The inner end of this shaft has a crank 239 keyed thereto and operatively engaging the forked end 240 of the crank 124. It should now be obvious that counterclockwise rotation of the shaft 238 will effect clockwise rotation of the shift lever 124 causing engagement of the clutch 122 which will produce power rotation of the selector valve 95.

This counterclockwise rotation will also effect shifting of the interlock valve plungers 108 and 232 toward the right as viewed in Figure 4. This will produce no operative effect so far as valve 233 and shifter lever 230 are concerned but movement of the valve plunger 108 will connect port 241 of the clutch cylinder 66 to reservoir through channel 242 and interconnected ports 243 and 244 of valve 104. The port 244 is connected through a hydraulic resistance 245 to the exhaust channel 246. The higher pressure in the right hand end of cylinder 66 will shift the piston 54 and effect disengagement of the spindle clutch 25. Shifting of the piston 54 will effect interconnection of ports 247 and 248 and since the port 247 is supplied by the pump 59 fluid pressure will flow through channel 249 to cylinder 250 to effect disengagement of the feed stop clutch 194. The cylinder 250 contains a piston 251 fixed to the end of a shifter rod 252 which carries a shifter fork 253 which operatively engages the clutch member 194. A spring 254 serves to reengage the feed clutch when the piston 54 returns and interconnects the port 248 to exhaust port 255 by means of the annular groove 256 formed in the piston. The port 255 is connected to reservoir through channel 257, interconnected ports 258 and 259 of valve 233 and return channel 260.

Movement of valve plunger 108 will also close pressure port 105, and interconnect port 106 with port 261. This will result in the supply line 262 of the selector valve being connected to the return line 246 causing a pressure drop in all the lines leading from the selector valve to the various shifter cylinders.

This also relieves internal pressure within the selector valve facilitating rotation thereof.

There is an interlock between the speed change mechanism and the spindle clutch cylinder for the purpose of insuring that all gears have been fully shifted before the clutch is reengaged after a speed change operation. This interlock is in the form of a channel which runs serially through the selector valve and various gear shifter cylinders to the spindle clutch servo-motor.

The selector valve supply line 262 forms the beginning of this channel. The channels 96 and 97 leading from the selector valve to shifter cylinder 94 constitute the next section of this channel. These two lines are alternately under pressure for shifting piston 93. The cylinder 94 is provided with two ports 263 and 264 which are so located that one or the other will be open when the piston 93 completes a shifting movement. For example, when the line 96 is connected to pressure, the piston 93 will be shifted to the right and as the shifting movement is completed, the port 263 will be uncovered, whereby the fluid pressure which did the shifting will flow through port 263 to channel 265. Port 264 is also connected to this channel whereby when the piston 93 completes its shifting movement to the left, channel 97 will be connected to channel 265. It is through channel 265, that pressure fluid is supplied to the spindle clutch servo-motor and to the power jogger.

The channel 265 is connected in parallel to four ports, two of which, 266 and 267, are in shifter cylinder 82 and the other two, 268 and 269, are in shifter cylinder 88. The ports 266, 267, 268 and 269 are connectible by annular grooves 270 and 271 in piston 81 and grooves 272 and 273 in piston 87 to ports 274, 275, 276 and 277 respectively. Only one pair of ports is interconnected at any one time. The fluid pressure from line 265 thus flows through one of the pairs of ports to channel 278 which terminate in ports 279 and 280 in shifter cylinder 91. These ports are alternately connectible to ports 281 and 282 by annular grooves 283 and 284 in piston 90. The ports 281 and 282 are connected by a common channel 285 to port 69 in the servo-valve sleeve 64.

It was stated in the description of the operation of the servo-valve sleeve 64 that the port 67 was a pressure port. It should now be evident that fluid pressure is supplied to this port through the interlock channel just described. In other words, the pressure fluid from the pump 59 flows through channel 58, branch line 286, interconnected ports 105 and 106 of valve 104, channel 262, selectively connectible ports in the selector valve whereby the fluid will continue through either channel 96 or 97, shifter cylinder 94, channel 265, one of the four annular grooves 270, 271, 272 or 273 of shifter pistons 81, 87, channel 278, one of the annular grooves 283, 284 of shifter piston 90 and channel 285 to port 67.

It should now be clear that the closing of port 105 and the opening of port 243 by the shifting of the interlock valve plunger 108 to the right in effect cuts off the supply of fluid pressure to the port 67 and thereby to the left end of cylinder 57, and at the same time connects the left end of the cylinder to reservoir whereby the constant pump pressure acting on the right end of piston 54 through the port 247 is enabled to shift the piston 54 to the left and in spite of the fact that the servo-valve sleeve 64 remains in the same position. Thus, the spindle clutch is automatically disengaged even although the control lever 79 remains in a running position. The other effect produced by the shifting of the interlock valve plunger 108 is the creation of a hydraulic unbalance in the hydraulic oscillator by the interconnection of the channel 285 to reservoir through the connection of port 106 to the exhaust port 261.

In other words, the exhaust line 146 from the hydraulic oscillator which merges with the line 285 is open to reservoir so that the constant pump pressure which is always present at the port 142 may cause actuation of the oscillator.

It should now be evident that rotation of the master control lever 236 in a direction to cause counterclockwise rotation of the shaft 238 to produce a change in speed rate while the machine is running, stops rotation of the spindle through disengagement of the spindle clutch, stops the feeding movement of the work support through disengagement of clutch 194, starts rotation of the selector valve and initiates actuation of the power jogging mechanism.

The operator watches the speed rate dial 128 and when the desired speed rate as indicated on the dial 128 registers with the arrow 287 he throws the lever 236 back to a neutral position. This immediately disengages the clutch 122 stopping rotation of the selector valve. The interlock valve plunger 108 will be delayed in returning by the choke coil 245. This will allow the pressure to gradually build up in the system to complete the shifting of gears as well as maintain operation of the hydraulic oscillator to facilitate shifting of the gears and when the full pump pressure is built up in the system the hydraulic oscillator will be hydraulically balanced and therefore stop, the spindle clutch will be reengaged starting rotation of the cutter, and completion of the shifting movement of piston 54 will cause reengagement of clutch 194 so that the feeding of the work support may be resumed.

When the lever 236 is rotated in the opposite direction to effect a change in the feed rate the shaft 238 is rotated in a clockwise direction causing operative engagement of the clutch 221' to drive the feed change mechanism and also cause shifting of the interlock valve plunger 232, closing port 259 and interconnecting port 258 with port 288. This results in the fluid pressure in the left end of cylinder 57 being connected through channel 242, interconnected ports 288 and 258, channel 257 and interconnected ports 255 and 248 to channel 249 to effect disengagement of the feed stop clutch 194 without disengaging the spindle clutch. The operator this time watches the feed rate dial 289 located on the exterior of the gear box 237 and operatively connected to the shaft 220' by gearing 290. When the proper feed rate on the dial registers with the arrow 291, the lever 236 is returned to neutral, disengaging the clutch 221' and reengaging the clutch 194.

Attention is invited to the fact that should a speed change operation be attempted when the spindle is not running, in other words, when the valve sleeve 64 is in the left hand position it will not interfere with the operation of the selector valve or the actuation of the power jogging mechanism.

It simply removes the necessity of automatically shifting the piston 54 because it will already be in the proper position.

There has thus been provided an improved control mechanism by means of which a speed change or a feed change may be effected in a milling machine, and through interconnections with a master control lever all the auxiliary functions incidental to effecting a change in speed or feed are automatically performed.

What is claimed is:

1. In a milling machine transmission having a prime mover and branch feed and speed transmissions for driving a work support and a tool spindle respectively, the combination of feed and speed change control mechanisms associated with the respective branch transmissions, a control lever alternately shiftable to effect power actuation of said control mechanisms, a clutch normally positioned for operatively connecting the output of the feed transmission to the work support, and means operable by the lever when shifted to either power actuating position to effect disengagement of said clutch.

2. In a milling machine transmission having a prime mover and branch feed and speed transmissions for actuating a work support and a tool spindle respectively, the combination of feed and speed change mechanisms associated with the respective transmissions, a control lever alternately shiftable to effect power actuation of the respective mechanisms, a first clutch for connecting the prime mover to the speed transmission, a second clutch for operatively connecting the output of the feed transmission for actuation of the work support, and means operable by the lever when shifted to either power actuating position to control the position of said clutches.

3. In a milling machine transmission having a prime mover and branch feed and speed transmissions for effecting actuation of a work support and a tool spindle respectively, the combination with feed and speed change control mechanisms associated with the respective branch transmissions, of a control lever alternately shiftable to effect power actuation of the respective mechanisms, a clutch normally connecting the output of the feed transmission for operation of the work support, a jogging mechanism for the speed transmission, and means operable by the control lever upon movement to effect power actuation of the speed change control mechanism to effect disengagement of said clutch and power actuation of said jogging mechanism.

4. In a milling machine transmission having a prime mover and branch feed and speed transmissions, the combination with feed and speed change control mechanisms associated with the respective transmissions, of a control lever having a first position for effecting power actuation of the feed rate control mechanism, and a second position for effecting power actuation of the speed change control mechanism, a clutch for connecting the prime mover to the speed transmission, a jogging mechanism for the speed transmission and means operable by the lever when in its second position for effecting disengagement of said clutch and power actuation of said jogging mechanism.

5. In a milling machine transmission having a prime mover and branch feed and speed transmissions operable thereby for actuation of a work support and a tool spindle respectively, the combination with feed and speed change control mechanisms associated with the respective transmissions, of a control lever having a first position for effecting power actuation of the feed rate control mechanism, and a second position for effecting power actuation of the speed change control mechanism, a first clutch for connecting the feed transmission for operation of the work support, a second clutch for connecting the speed transmission to the prime mover, a jogging mechanism for the speed transmission, means operable by the lever when shifted to its first position to effect disengagement of one of said clutches, and additional means operable by the lever when shifted to its second position to effect disengagement of both of said clutches and power actuation of said jogging mechanism.

6. In a milling machine having a spindle transmission and a speed change control mechanism therefor, the combination with a source of power and a clutch for connecting said source of power for actuation of the transmission, of manual control means for engaging and disengaging said clutch, a control lever shiftable to effect power operation of said speed change control mechanism, and additional means operable by the control lever to effect disengagement of said clutch and to prevent reengagement by said manual control means during operation of the speed change control mechanism.

7. In a milling machine having a spindle transmission and a speed change control mechanism associated therewith, the combination with a prime mover and a clutch for power coupling the prime mover for actuation of the transmission, of a brake member, a shifter for moving the clutch in one direction to effect said power coupling, and in the other direction to engage said brake, a control lever movable to an operative position to effect power actuation of said speed change mechanism, additional means operable by said lever for moving the clutch into engagement with said brake, and power operable means for imparting motion to said clutch through said brake member to effect jogging of the spindle transmission during actuation of the speed change control mechanism.

8. In a milling machine having a feed transmission for actuating a work support, and a speed transmission for actuating a tool spindle, the combination with means for changing the speed of said spindle transmission, of a control lever shiftable to effect power actuation of said means, and means operable by the lever to render the feed transmission inoperable for actuating the work support during actuation of said speed changing means.

9. In a milling machine having a feed transmission for actuating a work support and a speed transmission for actuating a tool spindle, the combination of a stop clutch in the feed transmission, power operable means for changing the rate of either transmission including a selector control lever, and means operable by the lever when shifted to either of its operative positions to effect disengagement of said stop clutch.

10. In a milling machine, the combination with a variable speed transmission for driving a tool spindle, a prime mover and a clutch for connecting the prime mover for actuation of the transmission, of a speed change control mechanism associated with the transmission, fluid operable means for actuating said clutch including a manual control lever, a second control lever for effecting power actuation of said speed change mechanism, and means controlled by the last-named lever to effect fluid shifting of said clutch independent of the manual control lever.

11. In a milling machine having a spindle transmission, a prime mover and a clutch for connecting the prime mover for operation of the transmission, the combination of a speed change mechanism for said transmission including a selector valve and a plurality of fluid operable shifters connected thereto, a fluid operable actuator for said clutch, a control lever shiftable to effect power positioning of said selector valve, a control valve associated with said lever having a source of pressure connected thereto, channel means connecting said selector valve and all of said fluid operable shifters in series between said control valve and said fluid operable actuator whereby when said control valve is positioned by the lever to connect the source of pressure to said channel means the clutch shifter will not operate until all of said fluid operable shifters have completed their movement.

12. In a milling machine having a spindle transmission, a prime mover and a clutch for connecting the prime mover for actuation of the transmission, the combination of a fluid operable piston for actuating said clutch, means normally holding said piston in a clutch disengaging position, a speed change mechanism for varying the speed of said transmission including a plurality of fluid operable gear shifters, a source of pressure, a first control valve for said piston, channel means connecting said source of pressure in series through said fluid operable shifters to the control valve, means for positioning said control valve to effect shifting of said piston to a clutch engaging position, a control lever for governing power operation of the speed change mechanism, and a second valve means associated with said lever for disconnecting the source of pressure from said first-named control valve during actuation of the speed change mechanism whereby said piston will effect disengagement of said clutch during operation of the speed change mechanism.

13. In a milling machine having a spindle transmission, a prime mover and a clutch for connecting said prime mover for operation of the transmission, the combination of a servo-motor mechanism for operating said clutch including a servo-valve having two positions, power actuators for shifting the gears of said transmission, a pressure line serially connected through said actuators to the servo-valve whereby said valve is ineffective until all shifters are in a final position, a control valve in said pressure line for stopping the flow of pressure to said servo-valve during operation of said shifters, and means for shifting said piston to a clutch disengaging position when the pressure is disconnected by said valve.

14. In a milling machine having a spindle transmission, a prime mover and a clutch for connecting the prime mover for operation of the transmission, the combination of a servo-motor for operating said clutch including a servo-valve, a plurality of fluid operable shifters for changing the speed of said transmission, a selector valve for determining and controlling the shifters to be operated, a control lever for determining power positioning of said selector valve, a control valve associated with said lever, channel means connecting said control valve, said selector valve, said shifters and said servo-valve in series in the order named whereby when pressure is disconnected from said selector valve the spindle clutch will be disengaged, and when pressure is connected to said selector valve said clutch will be engaged after all of said shifters have reached their final position.

15. In a milling machine having a spindle transmission, a prime mover and a clutch for connecting said prime mover to the transmission, the combination of a fluid operable piston for actuating said clutch, a source of pressure connected to one side of said piston for continuously urging the piston in a direction to disconnect said clutch, a speed change mechanism for said transmission including a plurality of fluid operable shifters and a selector valve for determining and controlling selective operation of said shifters, a fluid operable device for actuating the transmission during operation of the shifters and having a first port connected to a source of pressure, a second port connected to a return line, a control lever for determining power actuation of the selector valve, a control valve, channel means for connecting said control valve serially through the selector valve and said fluid operable shifters and in parallel to the other side of said clutch piston and to said return line, means in the control valve for connecting a source of pressure to said channel means to engage the clutch and stop said device, and means to shift the control valve in response to lever movement for connecting said channel means to reservoir whereby the clutch will be disengaged and the device will be energized to effect actuation of the spindle transmission.

16. In a milling machine having a work support and a tool support, the combination of driving means therefor including a prime mover and branch feed and speed transmissions for the respective supports, a first clutch for disconnecting the speed transmission from the prime mover independent of the feed transmission, a second clutch for connecting the output of the feed transmission to the work support, a feed change mechanism and a speed change mechanism associated with the respective branch transmissions, a control lever having a neutral position and alternately shiftable therefrom to effect power operation of the respective mechanisms, said speed change mechanism including a plurality of fluid operable shifters and a selector valve, fluid operable means for actuating each of said clutches including a piston for shifting the first-named clutch, channel means connecting the selector valve and fluid operable shifters in series with said piston, a control valve normally connecting pressure to said channel means, said control valve being responsive to movement of the lever in one direction from neutral to connect said channel means to reservoir to effect shifting of the first-named piston, and means controlled by said piston for connecting pressure to the second-named piston.

17. In a milling machine having separate power operable rate change mechanisms for the variable feed transmissions of the machine, and a common prime mover for said mechanisms and transmissions, of a common rate change control lever, movable to definite positions on opposite sides of a central position for selectively connecting said mechanisms for operation by the prime mover to change the rate of the respective transmissions, fluid operable control clutches for rendering each transmission drivingly effective, a selector valve and a jogging mechanism for the rate change mechanism of the variable speed transmission, a common hydraulic control circuit operatively connected to said clutches, selector valve and jogging mechanism, means responsive to movement of the rate control lever to its speed change position for disconnecting pressure from said circuit whereby said selector valve may be rotated without pressure connected thereto and said transmissions will be rendered drivingly ineffective during rate change operations and said jogging mechanism will be rendered effective to slowly drive the speed transmission to facilitate gear shifting when pressure is connected to the shiftable gears by the selector valve, and means responsive to completion of the gear shifting operation to stop operation of the jogging mechanism.

18. In a milling machine having separate power operable rate change mechanisms for the variable speed and variable feed transmissions of the machine, and a common prime mover for said mechanisms and transmissions, of a common rate change control lever, movable to definite positions on opposite sides of a central position for selectively connecting said mechanisms for operation by the prime mover to change the rate of the respective transmissions, fluid operable control clutches for rendering each transmission drivingly effective, a selector valve and a jogging mechanism for the rate change mechanism of the variable speed transmission, a common hydraulic control circuit operatively connected to said clutches, selector valve and jogging mechanism, means responsive to movement of the rate control lever to its speed change position for disconnecting pressure from said circuit whereby said selector valve may be rotated without pressure connected thereto and said transmissions will be rendered drivingly ineffective during rate change operations and said jogging mechanism will be rendered effective to slowly drive the speed transmission to facilitate gear shifting when pressure is connected to the shiftable gears by the selector valve, means responsive to completion of the gear shifting operation to stop operation of the jogging mechanism, and a second valve means responsive to movement of the rate change control lever to its feed change position to effect disengagement of said clutches and thereby render said transmissions drivingly ineffective during operation of the feed rate changing mechanism.

MARIO E. MARTELLOTTI.